(12) United States Patent
Jiang et al.

(10) Patent No.: US 11,544,064 B2
(45) Date of Patent: Jan. 3, 2023

(54) PROCESSOR FOR EXECUTING A LOOP ACCELERATION INSTRUCTION TO START AND END A LOOP

(71) Applicant: C-SKY Microsystems Co., Ltd., Zhejiang (CN)

(72) Inventors: Tao Jiang, Hangzhou (CN); Yubo Guo, Hangzhou (CN); Manzhou Wang, Hangzhou (CN); Dingyan Wei, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 266 days.

(21) Appl. No.: 16/479,361

(22) PCT Filed: Apr. 8, 2019

(86) PCT No.: PCT/CN2019/081699
§ 371 (c)(1),
(2) Date: Jul. 19, 2019

(87) PCT Pub. No.: WO2019/196776
PCT Pub. Date: Oct. 17, 2019

(65) Prior Publication Data
US 2021/0365265 A1    Nov. 25, 2021

(30) Foreign Application Priority Data
Apr. 9, 2018   (CN) .......................... 201810311679.4

(51) Int. Cl.
*G06F 9/30* (2018.01)
*G06F 9/32* (2018.01)

(52) U.S. Cl.
CPC .......... *G06F 9/30065* (2013.01); *G06F 9/325* (2013.01)

(58) Field of Classification Search
CPC ............................ G06F 9/30065; G06F 9/325
See application file for complete search history.

(56) References Cited

U.S. PATENT DOCUMENTS 5,303,355 A * 4/1994 Gergen ................. G06F 9/3842
                                                        712/226
5,507,027 A   4/1996 Kawamoto
(Continued)

FOREIGN PATENT DOCUMENTS

CN    102508635 A    6/2012
CN    103336681 A    10/2013
(Continued)

OTHER PUBLICATIONS

Extended European search report in related international Application No. 13784398.0, dated Mar. 23, 2021 (13 pages).
(Continued)

*Primary Examiner* — David J. Huisman
(74) *Attorney, Agent, or Firm* — Finnegan, Henderson, Farabow, Garrett & Dunner, LLP

(57) ABSTRACT

A processor achieving a zero-overhead loop, includes instruction stream control circuitry and loop control circuitry. The loop control circuitry includes loop address detecting circuitry and loop end determining circuitry. By combining instructions and hardware, the loop control circuitry eliminates additional control instructions required b each loop iteration and can achieve loop acceleration with zero overhead, thereby improving the loop execution efficiency.

7 Claims, 1 Drawing Sheet

(56) References Cited

U.S. PATENT DOCUMENTS

| | | | |
|---|---|---|---|
| 5,657,485 A * | 8/1997 | Streitenberger | G06F 9/325 711/217 |
| 5,710,913 A * | 1/1998 | Gupta | G06F 1/32 712/227 |
| 5,727,194 A * | 3/1998 | Shridhar | G06F 9/325 712/241 |
| 6,671,799 B1 | 12/2003 | Parthasarathy | |
| 7,272,704 B1 * | 9/2007 | Nguyen | G06F 9/3802 712/241 |
| 8,019,981 B1 | 9/2011 | Metzgen | |
| 9,286,066 B2 * | 3/2016 | Seki | G06F 9/30101 |
| 2005/0166036 A1 | 7/2005 | Catherwood et al. | |
| 2006/0107028 A1 * | 5/2006 | Meuwissen | G06F 9/30181 712/241 |
| 2006/0182135 A1 * | 8/2006 | Pisek | G06F 9/30101 370/406 |
| 2007/0186084 A1 * | 8/2007 | Chiba | G06F 9/381 712/241 |
| 2008/0141013 A1 | 6/2008 | Klima et al. | |
| 2012/0246449 A1 | 9/2012 | Assarpour et al. | |
| 2015/0227374 A1 | 8/2015 | Blasco et al. | |
| 2015/0309795 A1 | 10/2015 | Kurd et al. | |
| 2017/0344375 A1 | 11/2017 | Zhu et al. | |
| 2019/0095209 A1 * | 3/2019 | Grant | G06F 9/3005 |

FOREIGN PATENT DOCUMENTS

| | | |
|---|---|---|
| CN | 106997286 A | 8/2017 |
| CN | 107450888 A | 12/2017 |
| CN | 108595210 A | 9/2018 |
| GB | 2548603 A | 9/2017 |
| WO | WO 2019/196776 A1 | 10/2019 |

OTHER PUBLICATIONS

International search report and written opinion in related International Application No. PCT/CN2019/081699, dated Jul. 4, 2019 (9 pages).

First Search Report issued in corresponding Chinese Application No. 201810311679.4 dated Feb. 3, 2021 (2 pages).

Supplemental Search Report issued in corresponding Chinese Application No. 201810311679.4 dated Sep. 9, 2021 (1 page).

* cited by examiner

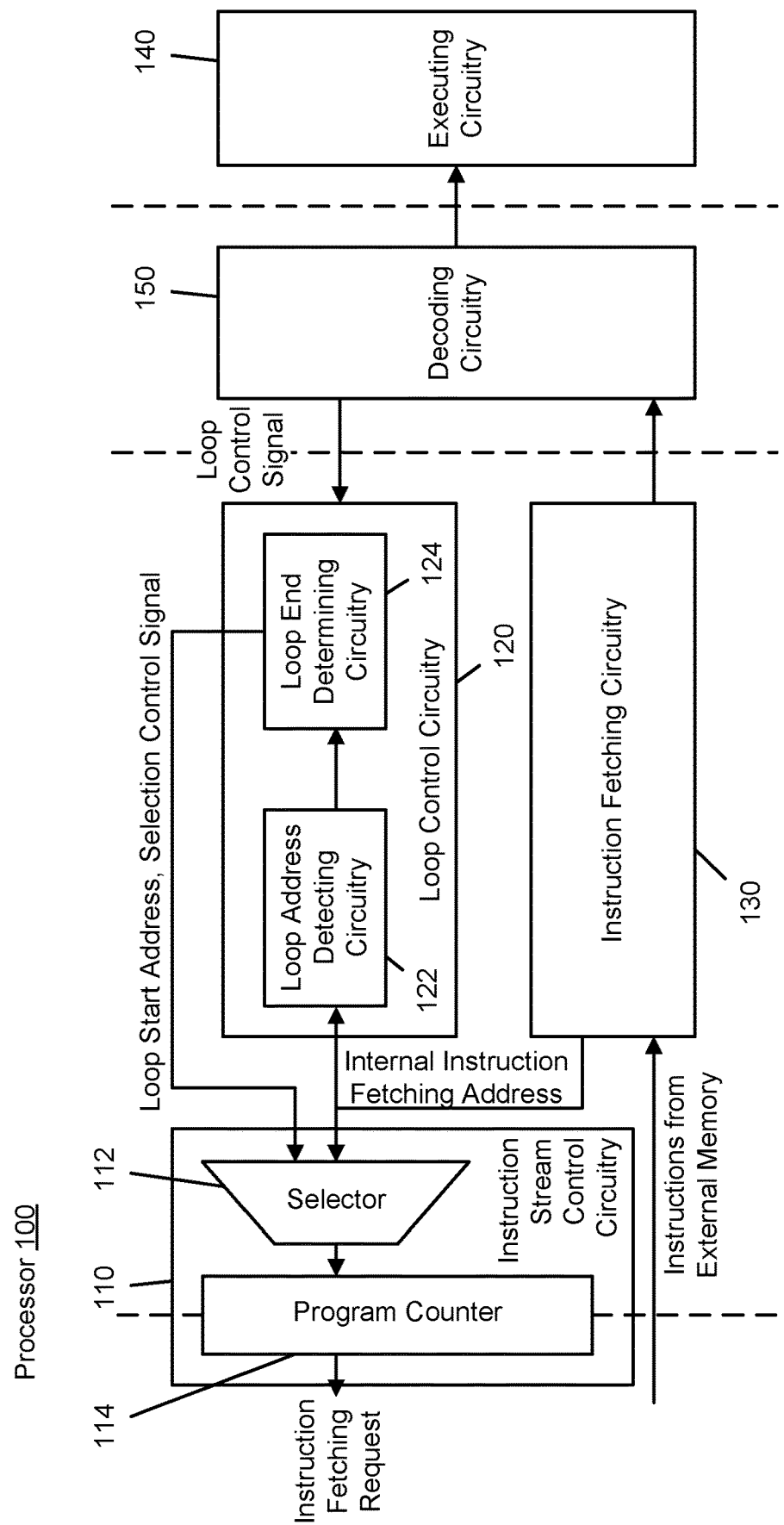

PROCESSOR FOR EXECUTING A LOOP ACCELERATION INSTRUCTION TO START AND END A LOOP

CROSS REFERENCE TO RELATED APPLICATION

This disclosure is a national stage filing under 35 U.S.C. § 371 of International Application No. PCT/CN2019/081699, filed on Apr. 8, 2019, which claims the benefits of priority to Chinese application number 201810311679.4, filed Apr. 9, 2018, both of which are incorporated herein by reference in their entireties.

BACKGROUND

In conventional systems, computer programs having loops are very common. One processing method is to use a general-purpose register to record a total number of iterations, use a subtract instruction to perform a minus-one operation on the general-purpose register after each iteration, and determine whether the number of iterations has reached a desired number. If more iterations are needed, additional jump instructions are used to return to the beginning of the loop. Such operations, however, typically add a plurality of additional instructions in a loop, thereby affecting the loop execution efficiency. Moreover, such operations have significantly adverse impacts in applications having short loops and high performance requirements.

SUMMARY OF THE DISCLOSURE

The present disclosure provides a processor achieving a zero-overhead loop, the processor comprising an instruction stream control circuitry and a loop control circuitry, wherein the loop control circuitry comprises a loop address detecting circuitry and a loop end determining circuitry. The loop control circuitry is configured to initialize a loop start address, a loop end address, and a loop exiting condition according to a loop control signal. The loop address detecting circuitry is configured to detect whether an internal instruction fetching address is within a loop address range and to send a loop terminating request to the loop end determining circuitry. The loop end determining circuitry is configured to determine whether the current loop execution satisfies the loop exiting condition. The instruction stream control circuitry is configured to maintain instruction fetching addresses.

Embodiments of the present disclosure further provide a processor to process loop instructions. Compared with the conventional systems, the present disclosure eliminates, by means of combining instructions and hardware, additional control instructions required by cacti iteration and can achieve loop acceleration with zero overhead, thereby improving, the loop execution efficiency.

BRIEF DESCRIPTION OF THE DRAWING

The FIGURE is a schematic diagram of an exemplary processor achieving a zero overhead loop, according to some embodiments of the present disclosure.

DETAILED DESCRIPTION

To make the objectives, technical solutions, and advantages of embodiments of the present disclosure clearer, the technical solutions in the embodiments of the present disclosure are described below with reference to the accompanying drawing in the embodiments of the present disclosure. Obviously, the described embodiments are merely some, rather than all, of the embodiments of the present disclosure. Based on the embodiments of the present disclosure, all other embodiments obtainable by a person skilled in the art without creative efforts shall fall within the protective scope of the present disclosure.

The processor provided in the present disclosure can eliminate, by means of combining instructions and hardware, additional control instructions required b each iteration and achieve loop acceleration with zero overhead. The FIGURE is a schematic diagram of an exemplary processor 100 achieving a zero-overhead loop, according to some embodiments of the present disclosure. As shown in the FIGURE, the processor 100 comprises an instruction stream control circuitry 10 and a loop control circuitry 120, where the hap control circuitry 120 comprises a loop address detecting circuitry 122 and a loop end determining circuitry 124.

Loop control circuitry 120 is configured to initialize and manage controls of a loop comprising loop instructions. The controls of the loop comprise a loop start address, a loop end address, and a loop exiting condition according to a loop control signal.

Loop address detecting circuitry 122 is configured to detect whether an internal instruction fetching address is within a loop address range, and to send a loop terminating request to loop end determining circuitry 124 when the internal instruction fetching address is equal to the loop end address.

Loop end determining circuitry 124 is configured to, upon receiving the loop terminating request, determine whether the loop instruction being currently executed satisfies the loop exiting condition. In some embodiments, loop end determining circuitry 124 is further configured to send the loop start address and a selection control signal to the instruction stream control circuitry 110 the current loop execution does not satisfy the loop exiting condition, and to update the internal instruction fetching address with the loop start address, If the current loop execution satisfies the loop exiting condition, loop end determining circuitry 124 is configured to update the internal instruction fetching address with a loop acceleration instruction address.

Instruction stream control circuitry 110 is configured to maintain instruction fetching addresses and to send an instruction fetching address for a next instruction fetching request to an external memory. If the instruction being executed is not the last loop instruction within the loop, the instruction fetching address is updated with the next instruction in the loop. If the instruction being executed is the last instruction in the loop, the instruction fetching address is updated according to the selection control signal. For example, when a loop jump is not needed, instruction stream control circuitry 110 maintains the instruction fetching address for the next instruction fetching request according, to the internal instruction fetching address for the current instruction fetching request. When a loop jump is needed, instruction stream control circuitry 110 maintains the instruction fetching address for the next instruction fetching request according to the loop start address selected for use by the selection control signal.

The embodiments of the present disclosure provide processor 100 to process loop instructions. Compared with the conventional systems, the present disclosure eliminates, by means of combining instructions and hardware, additional control instructions required by each iteration and can achieve loop acceleration with zero overhead, thereby improving the loop execution efficiency.

In some embodiments, as shown the FIGURE, instruction stream control circuitry 110 comprises a selector 112 and a program counter 114.

Selector 112 is configured to select to output either the loop start address to program counter 114 upon receiving the selection control signal, or the current instruction fetching address to program counter 114.

Program counter 114 is configured to obtain the instruction fetching address for the next instruction fetching request according to the output of selector 112 and to initiate a next instruction fetching request to the external memory.

In some embodiments, as shown in the FIGURE, processor 100 further comprises an instruction fetching circuitry 130, an executing circuitry 140, and a decoding circuitry 150.

Instruction fetching circuitry 130 is configured to receive instructions sent from the external memory. The instructions comprise the loop acceleration instruction.

Decoding circuitry 150 is configured to analyze the loop acceleration instruction when the loop starts, to generate a loop control signal and a flag-setting control signal according to the loop acceleration instruction, to send the loop control signal to loop control circuitry 120, and to send the flag-setting control signal to the executing circuitry 140. Decoding, circuitry 150 is further configured to analyze the loop acceleration instruction again when the loop ends, to generate a flag-clearing control signal according to the loop acceleration instruction and to send the flag-clearing control signal to executing circuitry 140.

Executing circuitry 140 is configured to execute the loop acceleration instruction when the loop starts, and to set, upon receiving the flag-setting control signal, a corresponding flag to trigger the loop to start. Executing circuitry 140 is further configured to execute, after receiving the flag-clearing control signal, the loop acceleration instruction again and clear the flag to end the loop.

Processor 100 achieves a zero-overhead loop according to the embodiments of the present disclosure by revising instruction stream control circuitry 110 by adding a hardware structure of loop control circuitry 120 in processor 100, and processes computer programs having loops by combining with the loop acceleration instruction. Throughout the entire operating process, the loop acceleration instruction may only have to be executed in the first and the last iterations. The first execution is to trigger the loop and control the instruction fetching circuitry 130 to lump to the start address of the loop, and after the loop exiting condition is satisfied, the loop acceleration instruction is executed once again to end the loop, while only the loop body is executed during the loop process. Compared with the conventional systems, the present disclosure can eliminate additional control instructions required by each iteration, achieve loop jump with zero overhead, and reduce the number of accesses to the external memory, thereby improving, the loop program execution efficiency and lowering system power consumption.

In some embodiments, the loop acceleration instruction is used to assign the loop start address, the loop end address, and the loop exiting condition.

In some embodiments, the loop control signal comprises the loop start address, the loop end address, and the loop exiting condition.

In some embodiments, the loop exiting condition includes the remaining number of iterations being zero, external interrupt, and debug request. When the loop exiting condition is the remaining number of iterations being zero, the loop acceleration instruction is further used to assign a total number of iterations.

The operating process of processor 100 achieving a zero-overhead loop according to the present disclosure is described below. In some embodiments, the loop acceleration instruction assigns the loop start address, the loop end address, the number of iterations, and the loop exiting condition, wherein the loop exiting condition is the remaining number of iterations being zero.

If not in a loop, selector 112 selects the internal instruction fetching address from instruction fetching circuitry 130 to send the internal instruction fetching address to program counter 114.

When the loop starts, decoding circuitry 150 analyzes the loop acceleration instruction, generates a loop control signal and a flag-setting control signal, sends the loop control signal to loop control circuitry 120, and sends the flag-setting control signal to executing circuitry 140.

Loop control circuitry 120 is configured to initialize a loop start address, a loop end address, and a loop exiting condition according to the loop control signal.

Executing circuitry 140 executes the loop acceleration instruction and sets a corresponding flag to trigger the loop and, at approximately the same time, uses the loop start address to update the internal instruction fetching address.

Selector 112 selects the internal instruction fetching address of instruction fetching circuitry 130, and instruction fetching circuitry 130 sequentially obtains instructions inside the loop.

Loop address detecting circuitry 122 detects whether the internal instruction fetching address is within the loop address range, and when the internal instruction fetching address is equal to the loop end address, sends a determining request to loop end determining circuitry 124.

Loop end determining circuitry 124 compares the current loop execution with the loop exiting condition. Loop end determining circuitry 124 is further configured to maintain loop execution, e.g., maintaining an internal loop counter to subtract one from the remaining number of iterations.

For example, if the loop end determining circuitry 124 determines that the remaining number of iterations is greater than 0, loop end determining circuitry 124 allows the loop execution to continue. At this moment, loop end determining circuitry 124 sends the loop start address and the selection control signal to selector 112 and triggers instruction fetching circuitry 130 to use the loop start address to update the internal instruction fetching address.

As a result, program counter 114 uses the loop start address to initiate, once again, an instruction fetching request to the external memory to start the loop over.

If loop end determining circuitry 124 determines that the remaining number of iterations equals 0, loop end determining circuitry 124 ends the loop. At this moment, loop end determining circuitry 124 triggers instruction fetching circuitry 130 to use the loop acceleration instruction address to update the internal instruction fetching address.

As a result, program counter 114 uses the loop acceleration instruction address to initiate an instruction fetching request to the external memory, and the instruction fetching circuitry 130 obtains the loop acceleration instruction again.

Decoding circuitry 150 analyzes the loop acceleration instruction again when the loop ends to generate a flag-clearing control signal and to send the flag-clearing control signal to executing circuitry 140.

After receiving the flag-clearing control signal from decoding circuitry 150, executing circuitry 140 executes the loop acceleration instruction and clears the flag to end the loop.

It is appreciated from the above operating process of the processor that the present disclosure uses the loop acceleration instruction for loop initialization. When the loop starts, it can be detected and determined, through hardware (e.g., the loop control logic) at the first stage of the pipeline e.g., the instruction fetching phase), whether jump is needed, and a desired instruction fetching request can be sent in the current iteration by controlling program counter 114. The loop jump and determination within the loop process do not need additional instructions to control, thereby completely achieving loop acceleration with zero overhead.

Only specific embodiments of the present disclosure are described above, but the protective scope of the present disclosure is not limited to these embodiments. Any variation or substitution that can be easily conceived of by a person skilled in the art within the technical scope disclosed by the present disclosure shall fall in the protective scope of the present disclosure. Therefore, the protective scope of the present disclosure shall be subjected to the protective scope of the claims.

The invention claimed is:

1. A processor for providing hardware controls to loop executions, comprising:
   loop control circuitry configured to initialize and manage controls of a loop comprising loop instructions, the loop control circuitry comprising:
      loop address detecting circuitry configured to:
         determine whether an internal instruction fetching address is an end address of the loop instructions; and
         send a loop terminating request in response to a determination that the internal instruction fetching address is the end address of the loop instructions; and
      loop end determining circuitry configured to:
         determine, upon receiving the loop terminating request, whether a loop exiting condition is satisfied;
         update the internal instruction fetching address according to a determination of whether the loop exiting condition is satisfied;
         if a loop instruction being executed does not satisfy the loop exiting condition, send a loop start address and a selection control signal to instruction stream control circuitry and update the internal instruction fetching address with the loop start address; and
         if the loop instruction being executed satisfies the loop exiting condition, update the internal instruction fetching address with a loop acceleration instruction address;
   wherein the instruction stream control circuitry is configured to:
      receive the internal instruction fetching address;
      maintain an instruction fetch address for a next instruction fetching request to an external memory according to the internal instruction fetching address; and
      send the next instruction fetching request to the external memory;
   instruction fetching circuitry configured to receive the loop instructions sent from the external memory, the loop instructions comprising a loop acceleration instruction;
   decoding circuitry configured to:
      analyze the loop acceleration instruction when the loop starts;
      generate a loop control signal and a flag-setting control signal according to the loop acceleration instruction;
      send the loop control signal to the loop control circuitry;
      send the flag-setting control signal to executing circuitry;
      analyze the loop acceleration instruction again when the loop ends;
      generate a flag-clearing control signal according to the loop acceleration instruction; and
      send the flag-clearing control signal to the executing circuitry;
   wherein the executing circuitry is configured to:
      execute the loop acceleration instruction when the loop starts;
      set, after receiving the flag-setting control signal, a corresponding flag to trigger the loop to start; and
      execute, after receiving the flag-clearing control signal, the loop acceleration instruction again and clear the flag to end the loop.

2. The processor of claim 1, wherein the instruction stream control circuitry is further configured to:
   send the instruction fetch address with the next instruction fetching request to the external memory;
   update the instruction fetch address according to the internal instruction fetching address if the loop instruction being executed is not the last instruction in the loop; and
   update the instruction fetch address according to the selection control signal if the loop instruction being executed is the last instruction in the loop.

3. The processor of claim 1, wherein the instruction stream control circuitry comprises:
   a selector configured to select to output the loop start address after receiving a selection control signal from the loop end determining circuitry, or to select to output the internal instruction fetching address; and
   a program counter configured to:
      obtain the instruction fetch address for the next instruction fetching request according to the output of the selector; and
      initiate the next instruction fetching request to the external memory.

4. The processor of claim 1, wherein the loop acceleration instruction is used to assign the loop start address, the loop end address, and the loop exiting condition.

5. The processor of claim 1, wherein the loop control signal comprises the loop start address, the loop end address, and the loop exiting condition.

6. The processor of claim 1, wherein the loop exiting condition comprises a remaining number of iterations being zero.

7. The processor according to claim 6, wherein the loop acceleration instruction is further used to assign a total number of iterations when the loop exiting condition is the remaining number of iterations being zero.

* * * * *